(12) United States Patent
Dwork et al.

(10) Patent No.: US 8,005,821 B2
(45) Date of Patent: Aug. 23, 2011

(54) NOISE IN SECURE FUNCTION EVALUATION

(75) Inventors: Cynthia Dwork, San Francisco, CA (US); Frank D. McSherry, San Francisco, CA (US)

(73) Assignee: Microsoft Corporation, Redmond, CA (US)

( * ) Notice: Subject to any disclaimer, the term of this patent is extended or adjusted under 35 U.S.C. 154(b) by 299 days.

(21) Appl. No.: 11/244,800

(22) Filed: Oct. 6, 2005

(65) Prior Publication Data
US 2007/0083493 A1 Apr. 12, 2007

(51) Int. Cl.
*G06F 7/00* (2006.01)
*G06F 17/30* (2006.01)
*G06F 17/00* (2006.01)
*G06F 3/00* (2006.01)

(52) U.S. Cl. ........ 707/718; 707/722; 707/759; 715/234; 715/758

(58) Field of Classification Search .............. 707/5, 531, 707/532, 3, 100, 1, 718, 722, 759; 704/9; 705/80, 50, 31, 26; 702/107; 703/3; 726/1; 725/19; 715/234, 758
See application file for complete search history.

(56) References Cited

U.S. PATENT DOCUMENTS

| | | | |
|---|---|---|---|
| 4,141,071 A | 2/1979 | Yerkes et al. | |
| 5,794,178 A * | 8/1998 | Caid et al. | 704/9 |
| 6,253,203 B1 | 6/2001 | O'Flaherty et al. | |
| 6,345,252 B1 * | 2/2002 | Beigi et al. | 704/272 |
| 6,636,887 B1 * | 10/2003 | Augeri | 709/203 |
| 7,043,640 B2 | 5/2006 | Pritchard et al. | |
| 7,162,456 B2 | 1/2007 | de Jong | |
| 7,363,192 B2 | 4/2008 | Dwork et al. | |
| 7,562,071 B2 | 7/2009 | Dwork et al. | |
| 7,698,250 B2 | 4/2010 | Dwork et al. | |
| 7,818,335 B2 | 10/2010 | Dwork et al. | |
| 2001/0042068 A1 * | 11/2001 | Yoshida et al. | 707/102 |
| 2002/0010679 A1 | 1/2002 | Felsher | |
| 2002/0065884 A1 | 5/2002 | Donoho et al. | |
| 2002/0111818 A1 * | 8/2002 | Morar et al. | 705/1 |
| 2002/0157020 A1 | 10/2002 | Royer | |
| 2003/0126139 A1 | 7/2003 | Lee et al. | |
| 2003/0204498 A1 * | 10/2003 | Lehnert | 707/3 |
| 2003/0229598 A1 | 12/2003 | de Jong | |
| 2004/0103066 A1 * | 5/2004 | Staddon et al. | 705/80 |
| 2004/0133927 A1 | 7/2004 | Sternberg et al. | |

(Continued)

OTHER PUBLICATIONS

Ben-Or, M., et al., "Completeness theorems for non-cryptographic fault-tolerant distributed computation," *ACM*, 1988, 1-10.

(Continued)

*Primary Examiner* — Mohammad Ali
*Assistant Examiner* — Bao G Tran
(74) *Attorney, Agent, or Firm* — Woodcock Washburn LLP

(57) ABSTRACT

Systems and methods for injecting noise into secure function evaluation to protect the privacy of the participants and for computing a collective noisy result by combining results and noise generated based on input from the participants. When implemented using distributed computing devices, each device may have access to a subset of data. A query may be distributed to the devices, and each device applies the query to its own subset of data to obtain a subset result. Each device then divides its subset result into one or more shares, and the shares are combined to form a collective result. The devices may also generate random bits. The random bits may be combined and used to generate noise. The collective result can be combined with the noise to obtain a collective noisy result.

13 Claims, 11 Drawing Sheets

U.S. PATENT DOCUMENTS

| | | | |
|---|---|---|---|
| 2004/0153456 A1* | 8/2004 | Charnock et al. | 707/10 |
| 2004/0268380 A1* | 12/2004 | Divakaran et al. | 725/19 |
| 2005/0021488 A1 | 1/2005 | Agrawal et al. | |
| 2005/0050010 A1* | 3/2005 | Linden | 707/3 |
| 2005/0183072 A1 | 8/2005 | Horning et al. | |
| 2005/0246391 A1 | 11/2005 | Gross | |
| 2005/0283455 A1* | 12/2005 | Kemmer et al. | 707/1 |
| 2006/0200431 A1 | 9/2006 | Dwork et al. | |
| 2006/0259263 A1* | 11/2006 | Ashley et al. | 702/107 |
| 2007/0022125 A1* | 1/2007 | Salam et al. | 707/100 |
| 2007/0054646 A1* | 3/2007 | Smith | 455/272 |
| 2007/0083493 A1 | 4/2007 | Dwork et al. | |
| 2007/0124268 A1 | 5/2007 | Dwork et al. | |
| 2007/0130147 A1 | 6/2007 | Dwork et al. | |
| 2007/0136027 A1 | 6/2007 | Dwork et al. | |
| 2007/0143289 A1 | 6/2007 | Dwork et al. | |
| 2007/0147606 A1 | 6/2007 | Dwork et al. | |
| 2007/0150437 A1 | 6/2007 | Dwork et al. | |
| 2009/0254971 A1* | 10/2009 | Herz et al. | 726/1 |

OTHER PUBLICATIONS

Blum, A., et al., "Practical privacy: The SuLQ framework," *PODS*, 2005, 128-138.

Chawla, S., et al., "On the utility of privacy-preserving histograms," *UAI*, 2005, 120-127.

Chawla, S., et al., "Toward privacy in public databases," *Theory of Cryptography Conference*, 2005, 363-385.

Dwork, et al., "Privacy-preserving datamining in vertically partitioned databases," *Crypto*, 2004, 17 pages.

Goldreich, O., et al., "How to play any mental game," *ACM*, 1987, 218-229.

Killian, J., "Secure Computation,"*Cryptography Tutorial*, http://www.cs.rutgers.edu/~ijkilian/lectures, downloaded from the Internet on Feb. 27, 2006.

U.S. Appl. No. 11/291,131, filed Nov. 30, 2005, Dwork et al.

U.S. Appl. No. 11/292,884, filed Dec. 2, 2005, Dwork et al.

U.S. Appl. No. 11/298,563, filed Dec. 9, 2005, Dwork et al.

U.S. Appl. No. 11/305,800, filed Dec. 16, 2005, Dwork et al.

U.S. Appl. No. 11/316,761, filed Dec. 22, 2005, Dwork et al.

Evfimievski, Alexandre Valentinovich, "Privacy Preserving Information Sharing", A Dissertation Presented to the Faculty of the Graduate School of Cornell University i Partial Fulfillment of the Requirements for the Degree of Doctor of Philosophy, Aug. 2004.

Hore, Bijit et al., "A Privacy-Preserving Index for Range Queries", Proceedings of the 30th VLDB Conference, Toronto, Canada, Aug. 31-Sep. 3, 2004.

Online Encyclopedia Entry, "Side-Channel Attack," Wikipedia, published Oct. 13, 2008, pp. 1-4.

Unknown, "Side Channel Attack," Wikipedia, published Jul. 18, 2004, pp. 1-3.

In the United States Patent and Trademark Office, Non Final Rejection dated Jun. 6, 2008, 17 pages, in U.S. Appl. No. 11/292,884, filed Dec. 2, 2005.

In the United States Patent and Trademark Office, Final Rejection dated Jan. 6, 2009, 15 pages, in U.S. Appl. No. 11/292,884, filed Dec. 2, 2005.

In the United States Patent and Trademark Office, Notice of Allowance dated Apr. 16, 2009, 4 pages, in U.S. Appl. No. 11/292,884, filed Dec. 2, 2005.

In the United States Patent and Trademark Office, Non Final Rejection dated Feb. 9, 2007, 8 pages, in U.S. Appl. No. 11/298,563, filed Dec. 9, 2005.

In the United States Patent and Trademark Office, Final Rejection dated Aug. 13, 2007, 7 pages, in U.S. Appl. No. 11/298,563, filed Dec. 9, 2005.

In the United States Patent and Trademark Office, Advisory Action dated Oct. 24, 2007, 3 pages, in U.S. Appl. No. 11/298,563, filed Dec. 9, 2005.

In the United States Patent and Trademark Office, Notice of Allowance dated Jan. 10, 2008, 3 pages, in U.S. Appl. No. 11/298,563, filed Dec. 9, 2005.

In the United States Patent and Trademark Office, Non Final Rejection dated Mar. 11, 2008, 8 pages, in U.S. Appl. No. 11/316,761, filed Dec. 22, 2005.

In the United States Patent and Trademark Office, Final Rejection dated Oct. 15, 2008, 13 pages, in U.S. Appl. No. 11/316,761, filed Dec. 22, 2005.

In the United States Patent and Trademark Office, Non Final Rejection dated Mar. 18, 2009, 12 pages, in U.S. Appl. No. 11/316,761, filed Dec. 22, 2005.

In the United States Patent and Trademark Office, Non Final Rejection dated May 21, 2008, 16 pages, in U.S. Appl. No. 11/305,800, filed Dec. 16, 2005.

In the United States Patent and Trademark Office, Final Rejection dated Sep. 29, 2008, 15 pages, in U.S. Appl. No. 11/305,800, filed Dec. 16, 2005.

In the United States Patent and Trademark Office, Advisory Action dated Jan. 7, 2009, 3 pages, in U.S. Appl. No. 11/305,800, filed Dec. 16, 2005.

In the United States Patent and Trademark Office, Non Final Rejection dated Apr. 29, 2009, 10 pages, in U.S. Appl. No. 11/305,800, filed Dec. 16, 2005.

In the United States Patent and Trademark Office, Non Final Rejection dated Nov. 15, 2007, 9 pages, in U.S. Appl. No. 11/291,131, filed Nov. 30, 2005.

In the United States Patent and Trademark Office, Final Rejection dated May 7, 2008, 8 pages, in U.S. Appl. No. 11/291,131, filed Nov. 30, 2005.

In the United States Patent and Trademark Office, Advisory Action dated Aug. 8, 2008, 2 pages, in U.S. Appl. No. 11/291,131, filed Nov. 30, 2005.

In the United States Patent and Trademark Office, Notice of Allowance dated Jan. 21, 2009, 4 pages, in U.S. Appl. No. 11/291,131, filed Nov. 30, 2005.

In the United States Patent and Trademark Office, Notice of Allowance dated Jul. 10, 2009, 6 pages, in U.S. Appl. No. 11/291,131, filed Nov. 30, 2005.

* cited by examiner

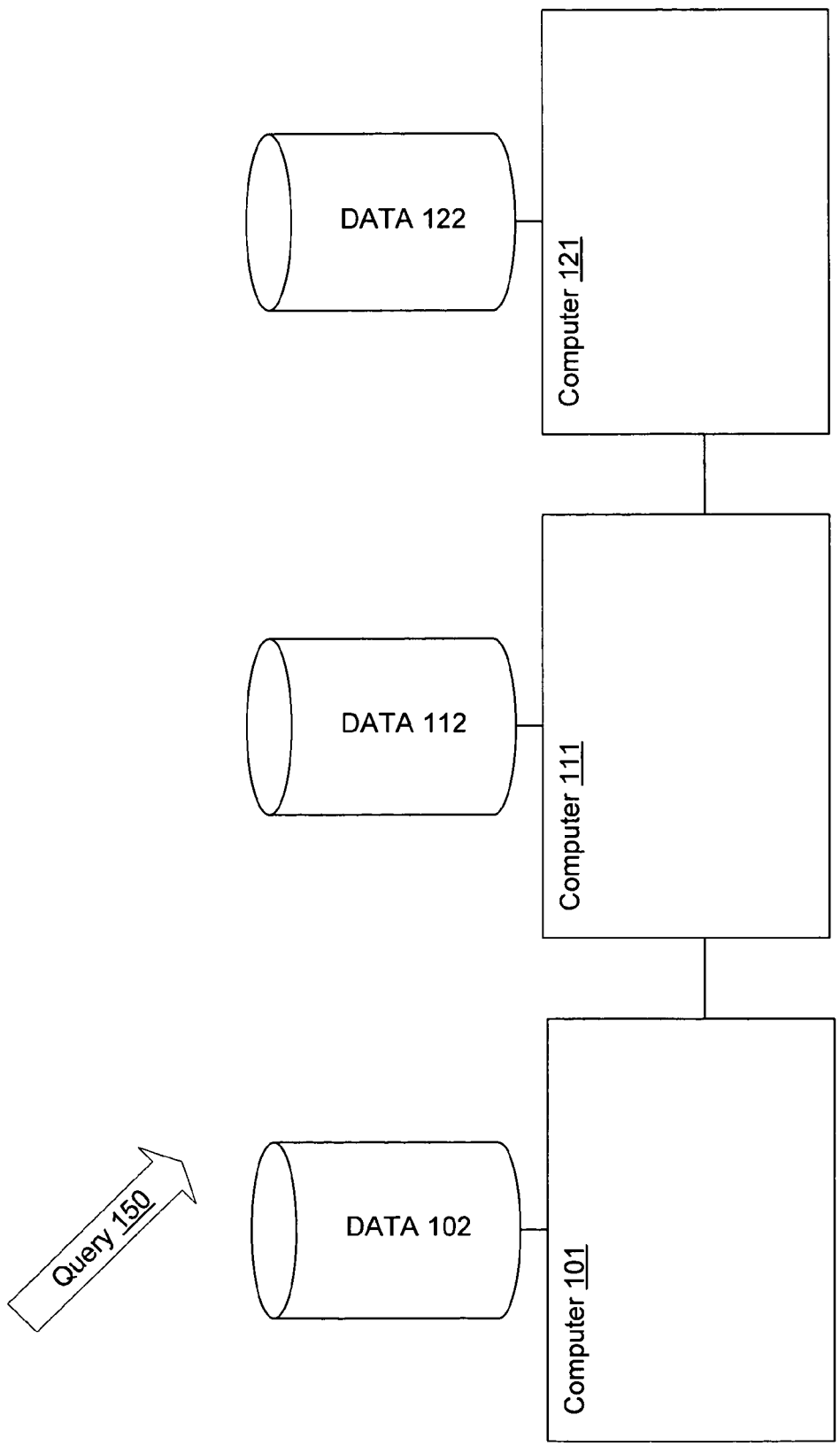

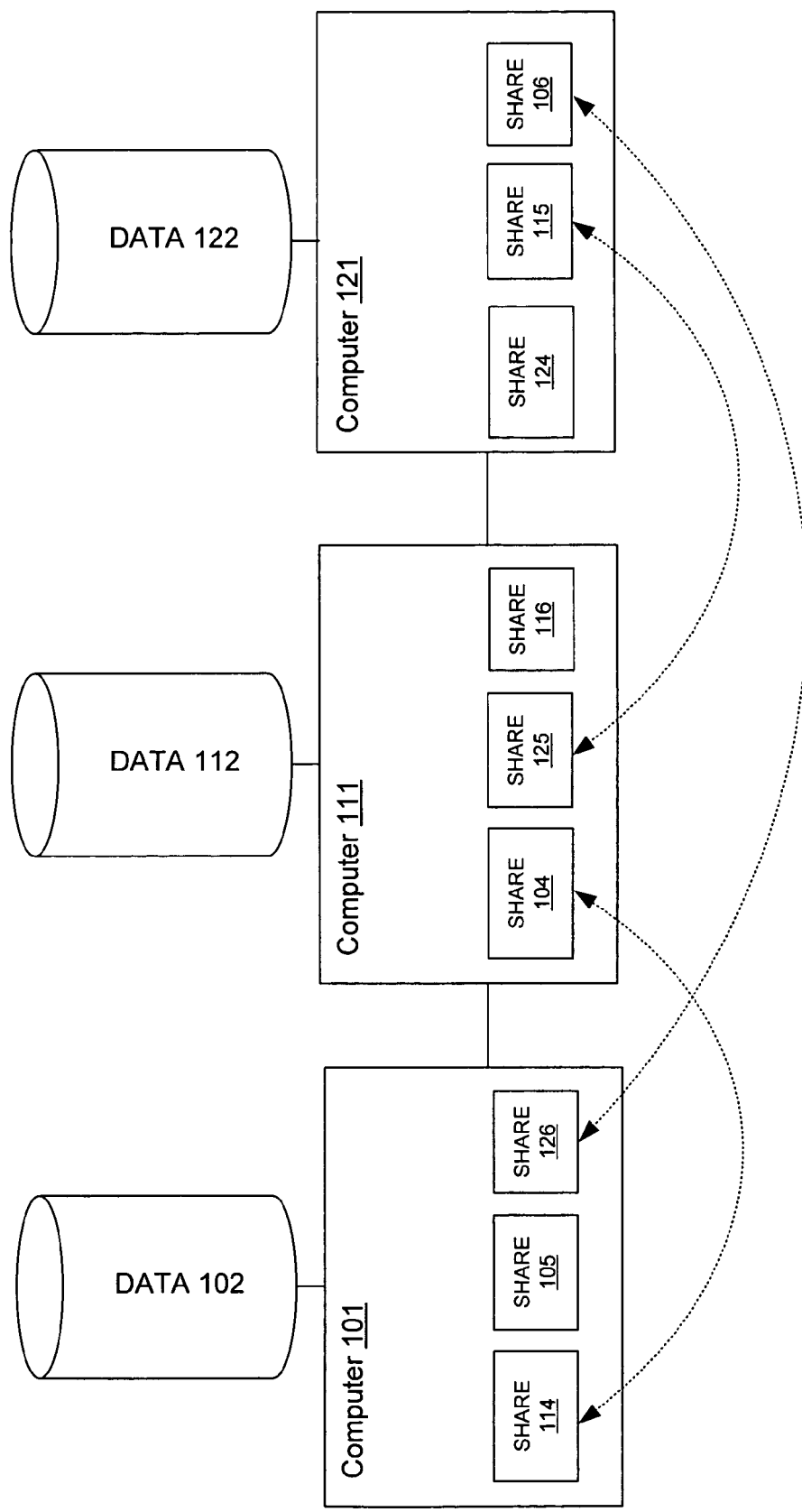

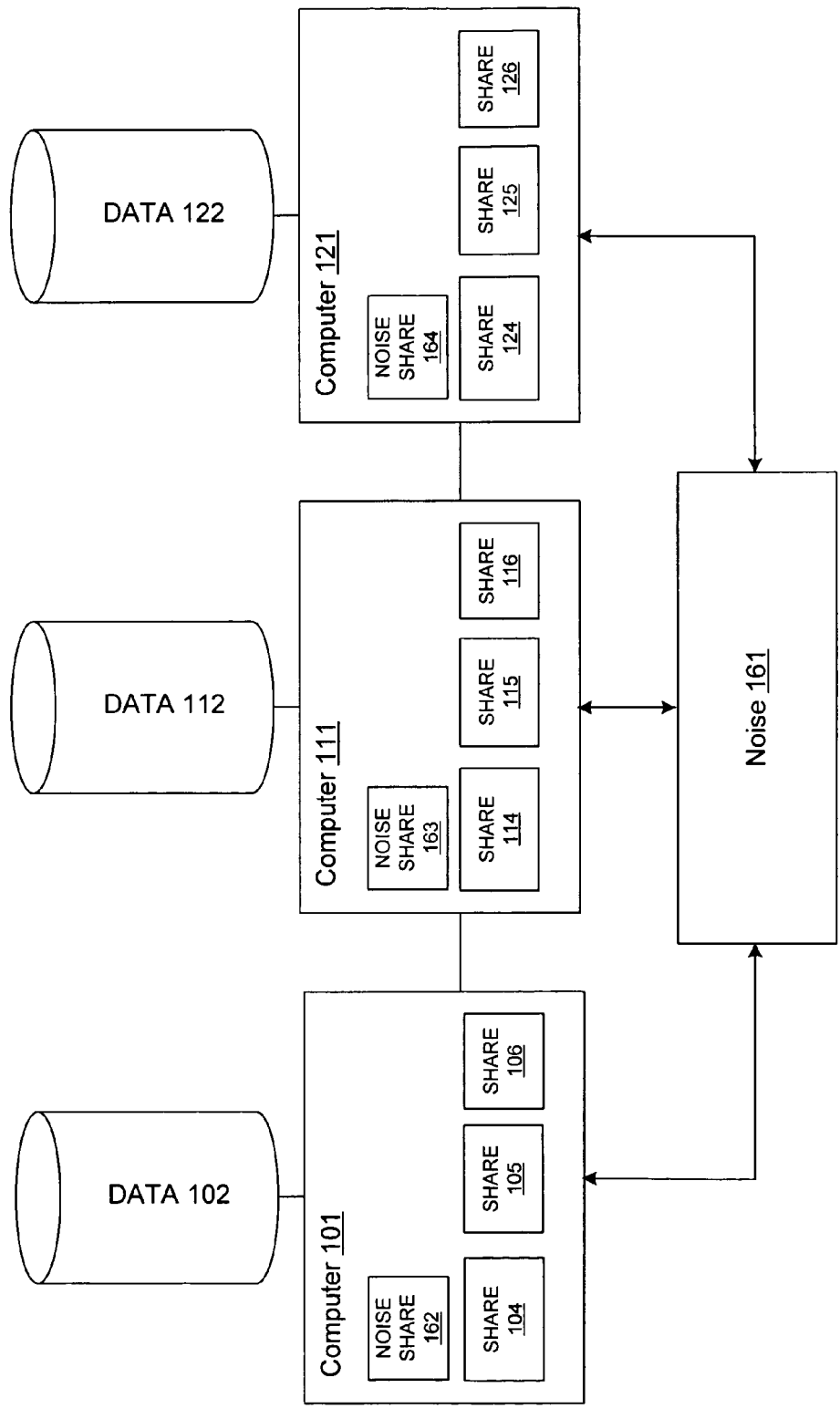

NOISE IN SECURE FUNCTION EVALUATION

BACKGROUND

Data collection is used to gather information for a wide variety of academic, business, and government purposes. For example, data collection is necessary for sociological studies, market research, and in the census. To maximize the utility of collected data, all data can be amassed and made available for analysis without any privacy controls. Of course, most people and organizations are unwilling to disclose all data, especially in modern times when data is easily exchanged and could fall into the wrong hands.

Complete privacy can be achieved by never releasing any data, however this would undermine the benefits of data collection. Some intermediate solution would be useful, whereby data can be disclosed with some guarantee that privacy will be respected. Such an intermediate solution may decrease the utility of collected data in some respects, however it can also increase the likelihood that data, especially sensitive data, will be disclosed at all.

So-called secure function evaluation techniques, developed in the 1980's, were a major advance in the ability of people, organizations, or other entities ("privacy principals") to compute a collective result without disclosing their individual data to one another. Secure function evaluation is explored in a variety of academic publications. For a background discussion of secure function evaluation, please refer to Ben-Or, Goldwasser, and Wigderson, "Completeness Theorems for Non-Cryptographic Fault-Tolerant Distributed Computation" (1988), and/or Goldreich, Micali, and Wigderson, "How to Play Any Mental Game" (1987). See also Chawla, Dwork, McSherry, Smith, and Wee, "Toward Privacy in Public Databases," Theory of Cryptography Conference, 2005; Dwork, Nissim, "Privacy-Preserving Data Mining in Vertically Partitioned Databases," Crypto 2004; Blum, Dwork, McSherry, Nissim, "Practical Privacy: The SuLQ Framework," PODS 2005; and Chawla, Dwork, McSherry, Talwar, "On the Utility of Privacy-Preserving Histograms," UAI 2005.

The academic literature also contains a variety of other references that, while useful for the study of secure function evaluation, are not relevant beyond the above-cited work to the invention discussed herein.

SUMMARY

The present invention provides for injecting noise into secure function evaluation to protect the privacy of the participants. A system and method are illustrated that can compute a collective noisy result by combining results and noise generated based on input from the participants. When implemented using distributed computing devices, each device may have access to a subset of data. A query may be distributed to the devices, and each device applies the query to its own subset of data to obtain a subset result. Each device then divides its subset result into one or more shares, and the shares are combined to form a collective result. The devices may also generate random bits. The random bits may be combined and used to generate noise. The collective result can be combined with the noise to obtain a collective noisy result. Additional features of the invention are described below.

DRAWINGS

The systems and methods for injecting noise in secure function evaluation in accordance with the present invention are further described with reference to the accompanying drawings in which:

FIG. 1A illustrates distributing a query to computing devices.

FIG. 1C illustrates distributing the shares among the computers.

FIG. 1D illustrates generating and distributing noise, such that shares of noise are obtained by the computing devices.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Secure function evaluation generally strives to compute a result based on inputs from a number of privacy principals, such that none of the principals can calculate another's input. There are a variety of clever ways to determine from an output what a principal's input likely was. The literature on secure function evaluation typically splits adversarial behavior into two categories: honest but curious—these players follow the protocol but try to extract information from every message they receive, even sometimes pooling knowledge within small coalitions—and so-called Byzantine players, who may not even follow the protocol. The invention provides techniques for injecting noise into secure function evaluation to thwart those who would try to observe or calculate another's input.

Figure 1B:
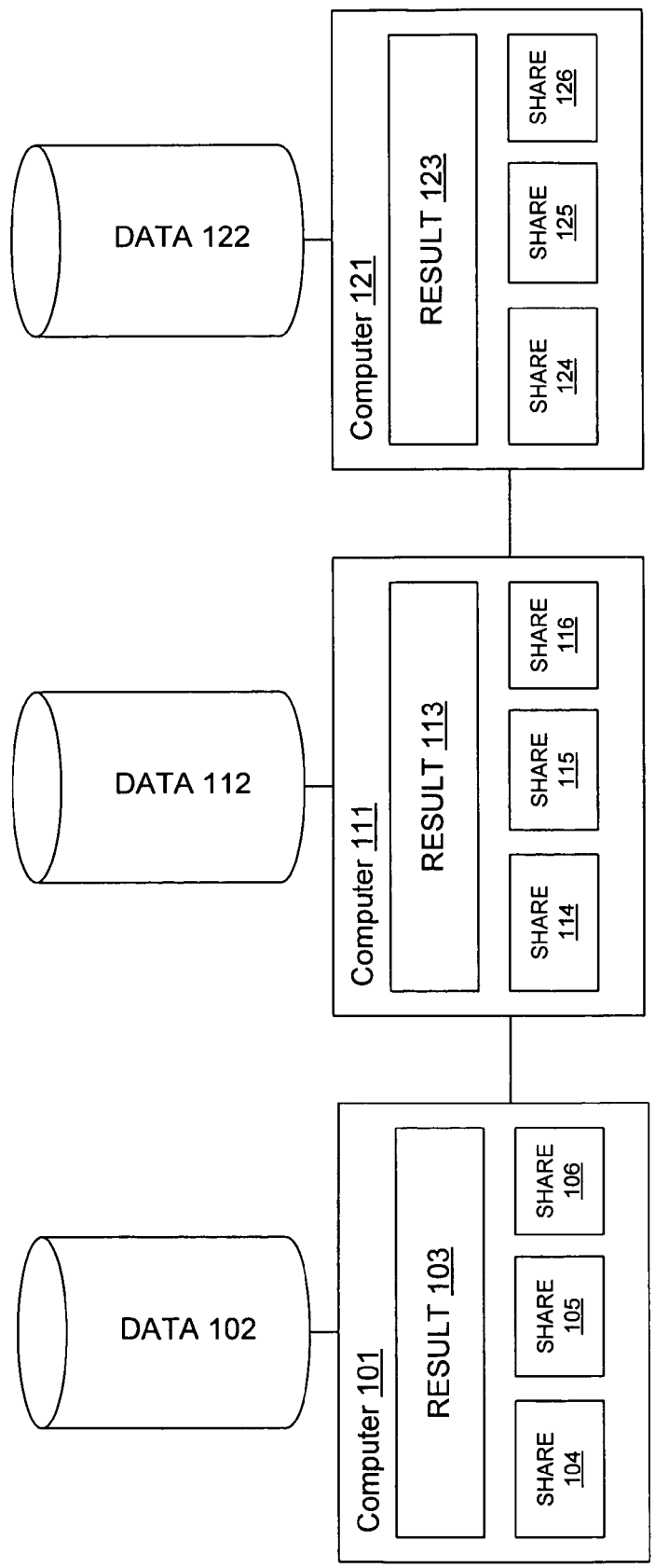
FIG. 1B illustrates applying the query to subsets of data to obtain subset results and each computing device dividing its subset result into one or more shares.

FIG. 1A-1F illustrate a system and method for computing a collective noisy result in accordance with one embodiment of the invention. FIG. 1A introduces a plurality of computers 101, 111, 121, each connected to a data source 102, 112, 122 respectively. While the invention is usefully described and implemented in the context of networked individual computers, it may also be implemented by any combination of privacy principals, which need not necessarily be individual computing devices.

Data sources 102, 112, and 122 each comprise a subset of the total possible data illustrated in FIG. 1A. Thus when a query 150 is to be conducted over the entirety of the data depicted in FIG. 1A, the query must be conducted over the subset of data in 102, the subset in 112, and the subset in 122. From the viewpoint of a single computing device 101, data 102 may appear to be the entirety of available data rather than a subset. Regardless, we know from a view of the whole system that 102 is in fact a subset of the data to which query 150 may be applied.

A data source 102 may comprise a subset of data that is privately stored on a computer. In modern computing, data can be accessed from a variety of locations. Thus, privately stored on a computer need not imply that the data is accessible only from the computer. The computer administrator may be able to set privacy controls that allow access by some from remote locations, for example. Privately stored, as the term is used here, implies that there are some privacy safeguards in place. The quintessential example of data that may be preferably stored privately is personal information about a human, such as medical history, financial data, marital history, and so forth. Many organizations also maintain data, e.g. competitive data that the organization desires to keep private to some degree.

Query 150 may be delivered to each computer using established means of communication between computing devices. Receiving a query in a computing context generally refers to the arrival of a sequence of electrical signals at a computing device, where the signals are recognized by the device as including an operation that is to be conducted on some data that can be accessed by the device. A query 150 may be simultaneously received by a plurality of computers when the query is received from a same sender at a substantially similar time.

Queries are functions that can be applied to data to obtain some result. There are an infinite number of query types that may be conducted. For example, a query may ask a particular set of data "how many people weigh over 70 kilograms?" For each person in the data set, the query can return a real number in the range [0,1]; e.g. it can return a zero if the person weighs 70 kilos or less, and a one if the person weighs more. The results may be summed to obtain the total number of people within the queried data that weigh over 70 kilos. Queries may be much more complex than this example, and need not apply a sum operation, as will be appreciated by those familiar with database technologies.

Data sources 102, 112, 122 may comprise databases, and as such, may comprise a number of independent "rows". Rows may contain any data: pictures, strings, sexual histories, medical records, etc. In the simplest form, a query may be a function that maps a row to a real number in the range [0,1]. In one embodiment, we define the quantity obtained by applying the query function to each row and summing the results to be the subset result. In one sense, this result is the "true answer" for the particular subset of data. Noise can be added to the true answer, to create and release a noisy value. Three privacy-preserving distributions on noise were discussed in the above-mentioned papers. In particular, in Blum, Dwork, McSherry, Nissim, "Practical Privacy: The SuLQ Framework," PODS 2005 it is shown that the amount of noise necessary for privacy depends only on the total number of queries to which any row in the database is exposed, e.g., the total number of queries to which the database responds, in its lifetime. We denote this bound T.

Thus, in some embodiments, each privacy principal, e.g., 101 could have its own, data-independent method for determining in which queries it is willing to participate. For example, some people may prefer to answer queries from the National Institutes of Health (NIH) than from the National Rifle Association (NRA), and may therefore choose to respond to the former but not to the latter. Such a policy may be consulted prior to participating in a particular query, as a means of restricting the total number of queries that a particular data subset is subjected to. Restricting queries allows for less noise, and therefore more accurate results, while still preserving privacy. However, for the sake of privacy it is important that the principal's policy be independent of its data. Otherwise, willingness to participate in a query may in itself disclose information about the principal.

For simplicity, let us assume that each individual is willing to participate in, say, 1000 queries in the course of her lifetime. That is, all individuals share a common value T, thereby limiting a number of queries that may be applied to their respective subsets of data. We do not assume that individuals agree on which queries they are willing to respond to. However, we will assume that there is always available a large set of parties, or in FIG. 1A, computers, willing to assist in the computation of the response to a query (even if they do not necessarily wish their own data to be included in the response). We call these parties "facilitators." A facilitator may or may not be a query respondent.

FIG. 1B illustrates the devices 101, 111, 121 after applying the query to their respective data 102, 112, 122. Each device has a subset result 103, 113, 123, respectively. The subset result is the result obtained by applying a query to a subset of data to which the query is directed. Standard database querying techniques may be used. Subset results 103, 113, 123 may be divided into one or more shares. Note that where the term "divided" is used herein, it does not refer exclusively to division. For example, a result of 5 (five) people weighing over 70 kilos could be "divided" into three shares, a first share of 1, 345, 432, a second share of 3, and third share of −1, 345, 430. When combined, in this case by adding the shares together, the true answer of 5 (five) can be obtained. Other implementations are possible that rely on application of some other function, e.g. multiplication, subtraction, some complex function, etc. to divide subset results into shares or reconstruct results from shares.

Subset result 103 is illustrated as being divided into shares 104, 105, and 106. Likewise, subset result 113 is illustrated as being divided into shares 114, 115, and 116, and subset result 123 is illustrated as being divided into shares 124, 125, and 126. An important observation is that while a privacy principal, e.g. 101 may not want to disclose its subset result 103, it may be willing to release shares 104, 105, and 106 under certain circumstances, because the subset result 103 may be impossible to guess without all the shares 104, 105, and 106.

FIG. 1C illustrates an embodiment of the invention in which the privacy principals 101, 111, 121 exchange shares. Here, 101 has exchanged 104 and 106 for 114 and 126. Principal 111 has exchanged 114 and 115 for 104 and 125. Principal 121 has exchanged 125 and 126 for 115 and 106. Share exchange may be accomplished in a number of configurations. For example, instead of each computer 101, 111, 121 exchanging shares with each other computer, the computers may send some shares to each of two central computers. Alternatively, they may send all shares to one central computer, where the central computer cannot decipher which of the other computers 101, 111, 121 a share came from. This variety of techniques are associated with secure function evaluation and the invention is not limited to any single flavor thereof.

FIG. 1D illustrates one embodiment for injecting noise into the calculation of a collective noisy result. By injecting noise, the subset result of any given computer can become impossible to decipher, thereby enhancing privacy in secure function evaluation operations. The various computers 101, 111, 121 may each participate in generating and combining random bits, wherein a combination of random bits is used to generate noise, and the noise is ultimately combined with the collective result to obtain a collective noisy result. Noise is understood to be some unpredictable quantity that either increases or decreases a result. In one embodiment, total noise added to a result may never be known by anyone, however the distribution of possible noise values can be known, so that once the collective noisy result is calculated it is understood to be most likely within the range of an actual collective result.

It is contemplated that in some embodiments, computers 101, 111, 121 would be controlled by individuals, and such individuals can completely control the participation of their own data in statistical queries. For example, each person could maintain her own data, storing it on her own secure server. Query responses are then computed using techniques of so-called secure function evaluation, along with the noise injection techniques described herein. Very roughly, secure function evaluation permits a collection of parties to cooperatively compute a function of their individual inputs in such a way that no small coalition of players can learn anything about the inputs of players outside the coalition, except what can be gleaned from the output of the function and the inputs of players inside the coalition. If the function is the noisy sum produced, for example, by the K ("Kinsey") mechanism for injecting noise in responses to database queries, then by definition this value is non-disclosive, so the above clause "except what can be gleaned from the output of the function and the inputs of players inside the coalition" translates to "except nothing".

On query f, each participant i with data "row i" can use uses (verifiable) secret sharing to distribute shares of f(row i) to facilitators. Specifically, these may be shares of a polynomial. The sum of shares is a share of the sum: that is, if each facilitator sums the shares received from each participant, then the result is a share of the true collective answer to the query. In addition, the facilitators may run a noise generation protocol that securely distributes shares of an appropriately selected value for the random noise. Each facilitator adds its share of the noise to the share of the true answer to obtain a share of the noisy answer. The facilitators then combine their shares via a reconstruction protocol for (verifiable) secret sharing, and announce the noisy result of the query. In FIG. 1A-1F, each computer may also be considered a facilitator.

The main work is to construct a share of the noise. Binomial noise, adequate for the case in which the functions f are 0/1 valued, is easy to construct, as there are several protocols for securely generating (shares of) relatively unbiased random bits. These shares can then be added to obtain a share of the binomial noise. Noise can be generated according to the exponential distribution instead of the normal distribution in some contexts. Any noise generation approach is appropriate for use herein.

The system for generating and combining random bits is illustrated as 161, and may involve software that executes noise generation instructions on any of computers 101, 111, 121. In the illustrated embodiment, random bits can be "divided" into shares that can be distributed among the various computers. Once again, the term "divided" need not require the mathematical operation known as division, but may imply separating a value into some set of constituent values that can be recombined to recreate the original value.

Noise may be produced by first generating random bits at each computer 101, 111, 121. A cryptographic primitive called distributed coin flipping may be used. Bits at the various computers (some of which will be unbiased—the faulty computers may have biased bits, but the non-faulty ones will have unbiased bits) can be divided into shares, and the shares can be exchanged and combined to obtain shares of (common) relatively unbiased random bits, say, with 1 representing heads and −1 representing tails. The result is that each computer can have a share of the sum of random bits. Noise can be generated based on this share of the sum.

Note that the standard distributed coin flipping protocols do not operate over the integers, but instead over the finite field GF[2]. This is not conducive for the addition stage, because, GF[2] only contains the elements 0 and 1. However, there are generic solutions to this difficulty which are known to those of skill in the art, and specifying particular implementation details is not necessary to enable the invention in this respect.

Alternatively, noise can be generated by generating random bits at each computer, and sending those bits to one or more central computing devices. The central computing device can combine the random bits, for example using the XOR operation. The XOR operation can be expressed as follows:

C=xor(A, B) performs an exclusive OR operation on the corresponding elements of arrays A and B. The resulting element C(i, j, . . . ) is logical true (1) if A(i, j, . . . ) or B(i, j, . . . ), but not both, is nonzero. The below chart represents C for various inputs A and B:

| A | B | C |
|---|---|---|
| Zero | Zero | 0 |
| Zero | Nonzero | 1 |
| Nonzero | Zero | 1 |
| Nonzero | Nonzero | 0 |

Noise may then be generated based on the result of combining the random bits. This embodiment is discussed in greater detail with respect to FIG. 5.

Figure 1E:
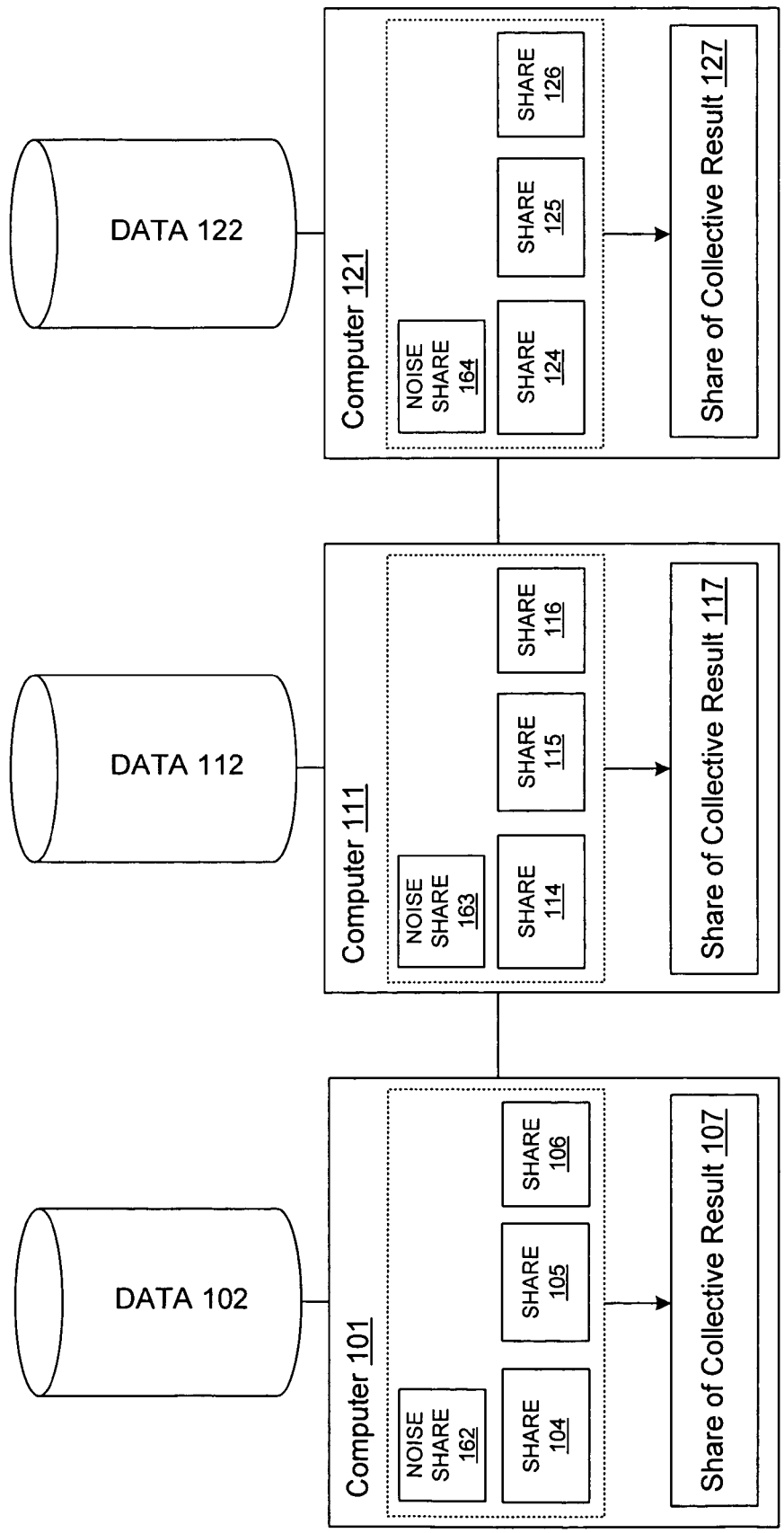
FIG. 1E illustrates combining subset results and noise to obtain at least one share of a collective noisy result.

FIG. 1E represents combining shares of a result and shares of noise to obtain shares of a collective noisy result 107, 117, 127. Note that there are a variety of sequences that will function properly at this stage. For example, shares of a collective result may first be calculated without including the noise shares, and the noise shares may be sent to some central location to be combined with the collective result at a later time. Alternatively, all shares of subset results may be sent to a central location without any information to specify whether or not the shares represent noise. The shares may then be combined at the central location. Solutions may be chosen based on the privacy requirements and practical considerations of a particular system.

Figure 1F:
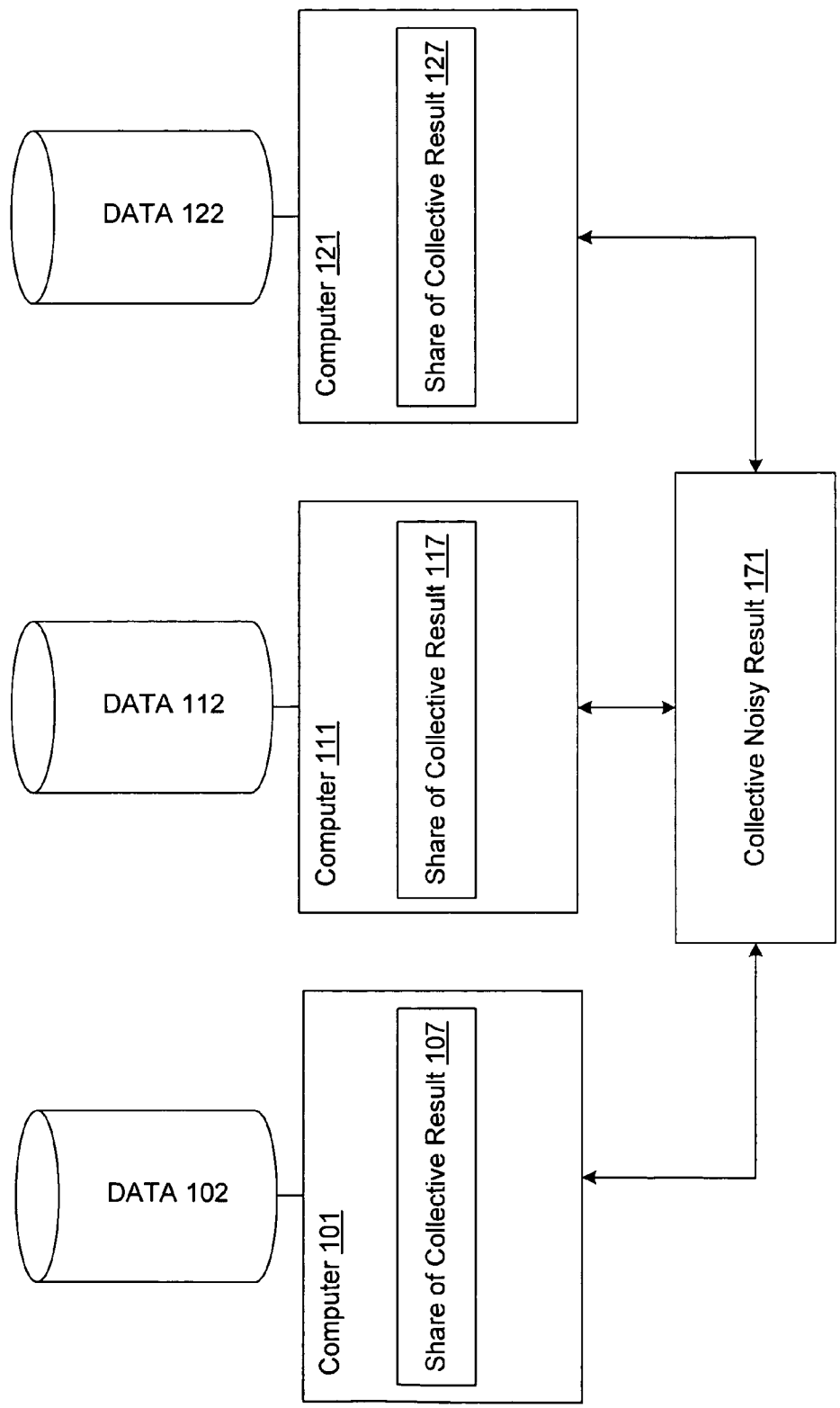
FIG. 1F illustrates reconstructing the collective noisy result from the shares obtained by the computing devices.

FIG. 1F illustrates participating in combining shares of a collective noisy result to obtain the collective noisy result 171. The collective noisy result 171 is the final output of the system described with respect to FIG. 1A-1F. When the various safeguards as described herein are in place to preserve privacy, the inputs of the various privacy principals can be very difficult or impossible to decipher from the noisy result 171.

While FIG. 1F illustrates pre-combined shares of a collective result 107, 117, 127, ultimately such pre-combined shares are made up of shares of subset results as depicted in FIG. 1E. Thus, FIG. 1F should be understood to reflect participating in combining shares of subset results and noise to obtain a collective noisy result, regardless of whether the subset results are pre-combined into shares of a collective (noisy or true) result. Participating, as that term is used herein, is intended to be understood as any participation in steps that facilitate combining. For example, delivering shares of subset results to another computer so that said shares can later be combined is considered to be participation in combining.

Combining, as the term is used here, is not intended to imply any particular mathematical function. Combining can comprise addition, subtraction, multiplication, or application of any function as a means of combining the various inputs.

Figure 2:
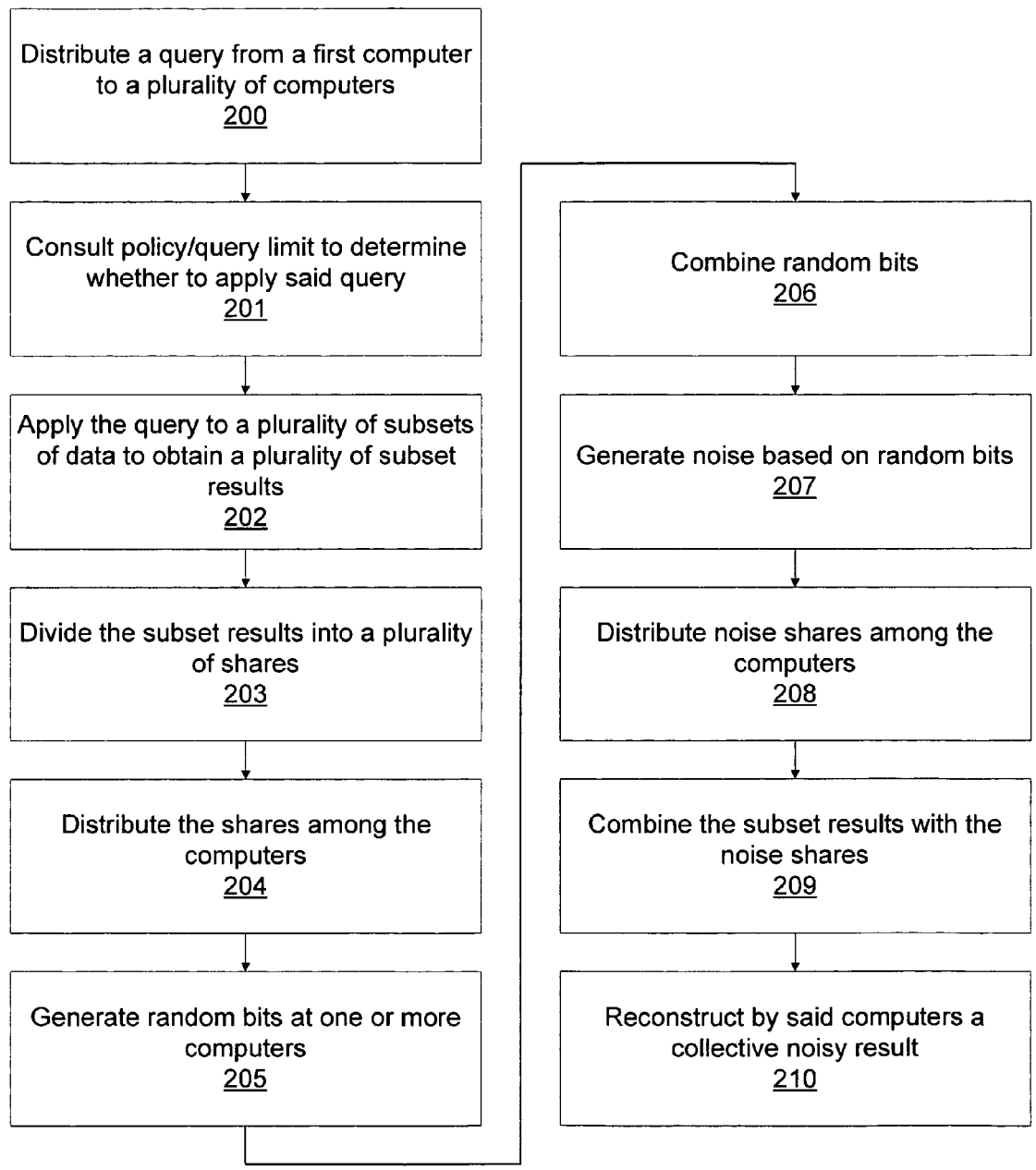
FIG. 2 illustrates a method employed by the system illustrated in FIGS. 1A-1F.
Figure 3:
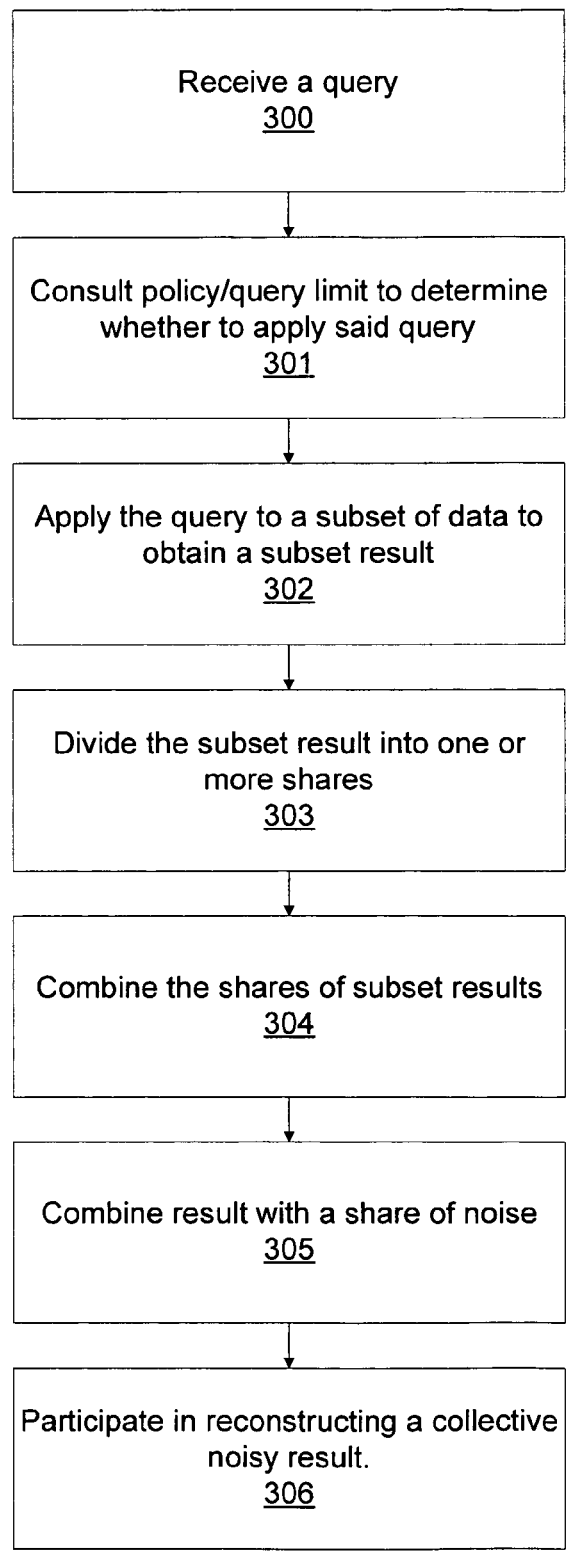
FIG. 3 illustrates method employed by one of the computing devices in the system illustrated in FIGS. 1A-1F.

FIG. 2 illustrates a method for injecting noise into a secure function evaluation process in accordance with the invention. Both FIG. 2 and FIG. 3 contemplate a process that is implemented across a plurality of computing devices. FIG. 2 illustrates method steps that may be carried out by the entire system, while FIG. 3 illustrates method steps that may be carried out from the perspective of a single networked computer within such a system.

As illustrated in FIG. 2, a method for computing a collective noisy result may comprise distributing a query from a first computer to a plurality of computers 200. If any of the computers are configured to accept or reject queries based on a policy, they may do so 201. Next, the computers may apply the query to their respective subsets of data, to obtain a plurality of subset results 202. The computers may then divide the subset results into one or more shares 203, and distribute the shares among the computers 204. Note that the distribution step 204 may be implemented in alternative embodiments that limit the number of computers that receive the shares.

Next, some or all of the participating computers can generate random bits 205. The computers then participate in combining the random bits 206, which may include simply sending the bits to a central server, or may involve receiving and combining bits locally in a distributed computing fashion. At least one computer may generate noise based on the combination of random bits 207. In some embodiments, noise shares may be generated at each participating computer, so step 208 becomes unnecessary. In other embodiments, noise may be generated and divided into shares by at least one first computer, and the shares may be distributed 208 among the various participating computers. In yet another embodiment, noise may be generated at a central server and not distributed to the various participants, again rendering 208 unnecessary.

Subset results may be combined with noise 209. If noise is divided into shares and distributed among the various computers, step 209 may be conducted at each participating computer. Otherwise, as reflected in the above embodiments, the noise may be added to the subset results at some other point, such as by a central server that accumulates all subset results and noise. Finally, a collective noisy result is revealed 210. At least one computer generates a collective noisy result by combining subset results, shares of collective results, or the like, referred to collectively as "collective results" with the noise.

FIG. 3 illustrates method steps that may be carried out from the perspective of a single networked computer within a plurality of computers that are participating in practicing the invention. Such a computer may first receive a query 300. If it has a policy to determine whether or not to answer the query, the policy can be consulted 301. It may next apply the query to its particular subset of data to obtain a subset result 302, and divide the subset result into one or more shares 303. The shares may be exchanged with other computers. It can next participate in combining the shares of subset results 304, as well as generating, distributing, and/or combining noise or a share of noise with results 305. This can involve generating random bits, as described above. It may also involve combining random bits generated by some other computer, and generating noise based on the combination. Finally, the computer may participate in reconstructing a collective noisy result 306.

Figure 4:
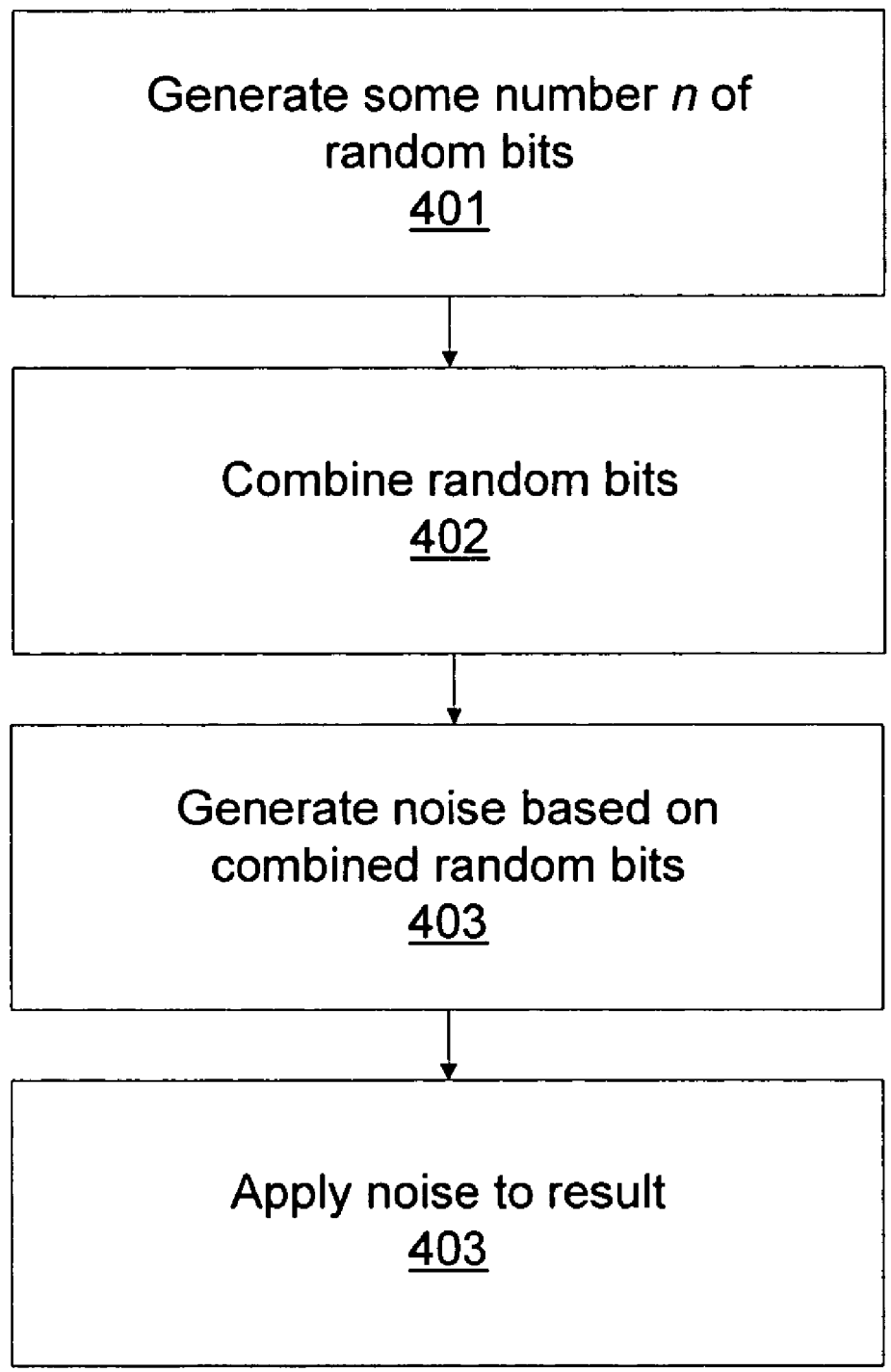
FIG. 4 illustrates an exemplary mechanism for adding noise to a query result.

FIG. 4 illustrates one embodiment of a process for generating noise that can be injected into a secure function evaluation output. First, a computer can generate some number n of random bits 401. There are a variety of protocols, such as coin flipping protocols, that can generate random bits. Any such protocol is appropriate. Next, the random bits, generated for example at a plurality of networked computers, may be combined 402. In one embodiment, a first computer may combine a first subset of bits, for example the first, second, and third random bits generated at each of the plurality of computers. In another embodiment, all random bits may be sent to one or more central servers to be combined.

A variety of functions may be applied to combine bits. The exclusive or (XOR) is one such function. However, this is one of a potentially infinite variety of functions that could be used in the combination of bits and the invention is not limited to any single function.

Noise may be generated based on the combined random bits 403. A wide array of possible noise generation mechanisms are possible and any such mechanism is appropriate. In general, noise generation involves generating some output that can be added to or subtracted from a result to obscure the true result. However, the possible noise values should be constrained such that a noisy result can be considered to be likely within some range of the actual result. Thus, the probable value of noise can be scaled to be proportional to the results in question. A likely noise value of anywhere from 1 to 100 would not be useful in the context of a result that is in the range of 5 to 10. Instead, a likely noise value of 1 to 2 would be more appropriate in such a setting. Generated noise can be applied to the result 403.

Figure 5:
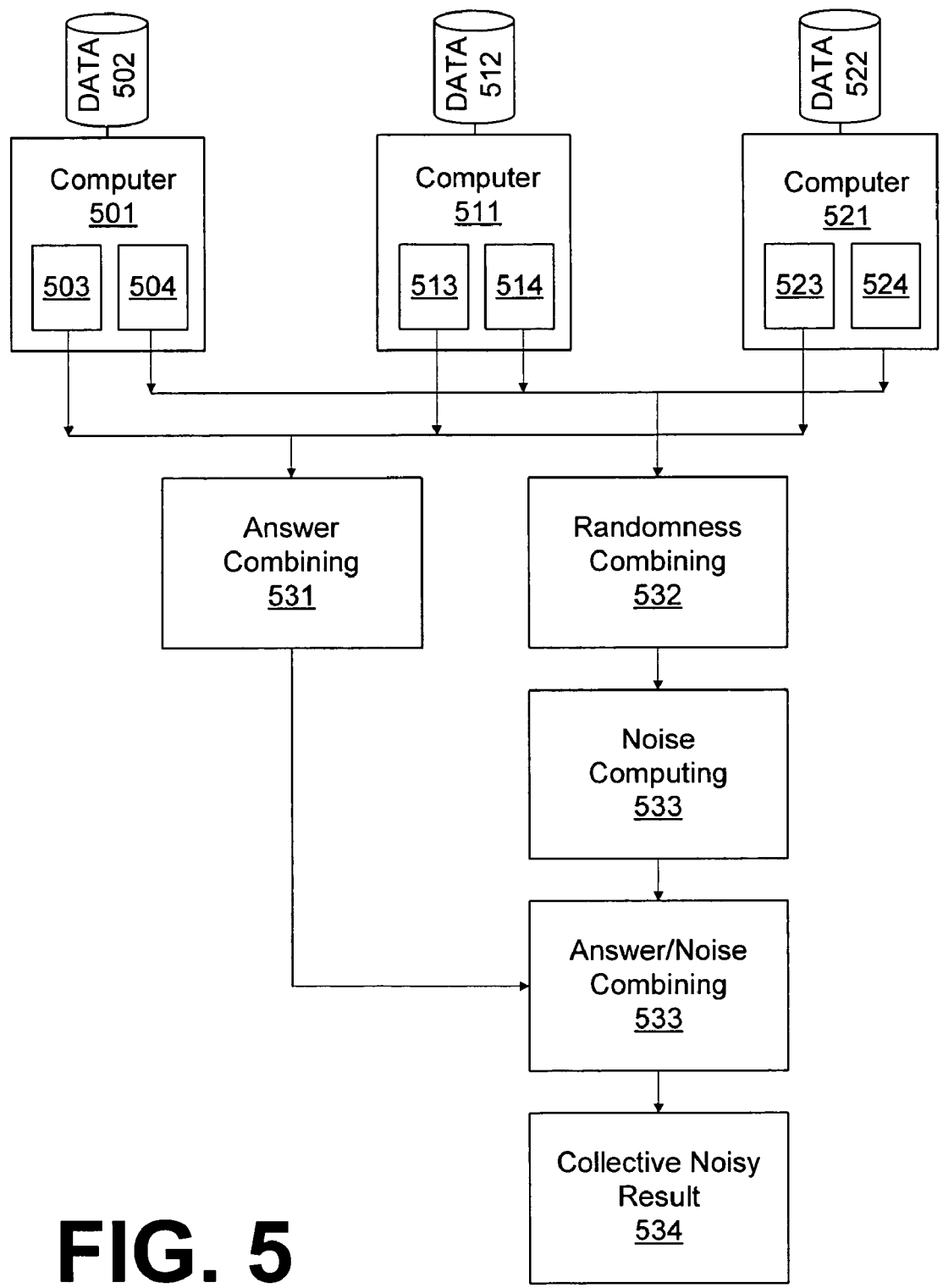
FIG. 5 illustrates an embodiment of the invention in which a plurality of computers send shares of a subset result to an answer combining mechanism, and send random bits to a randomness combining mechanism. Noise can be generated by 532 based on the combined random bits, and the collective answer and noise can be combined in 533 to obtain a collective noisy result.

FIG. 5 illustrates an alternative embodiment of the invention, in contrast to FIG. 1A-1F. In general, a system configured in the illustrated manner will combine subset results at some central location 431, and will also combine random bits 532, compute noise 533, and combine results and noise 534 centrally. While a configuration such as FIG. 5 may not offer the total privacy guarantees of a system configured according to 1A-1F, it can nonetheless offer enhanced privacy by adding noise to a secure function evaluation process.

FIG. 5 illustrates an alternative embodiment of the invention, in contrast to FIGS. 1A-1F. In general, a system configured in the illustrated manner will combine subset results at some central location 531, and will also combine random bits 532, compute noise 533, and combine results and noise 534 centrally. While a configuration such as FIG. 5 may not offer the total privacy guarantees of a system configured according to 1A-1F, it can nonetheless offer enhanced privacy by adding noise to a secure function evaluation process.

Subset results 503, 513, 523 can be sent to an answer combining mechanism 531. This may, for example, be one or more central servers configured to combine shares of results into a collective result. Random bits 504, 514, 524 may be sent to a randomness combining mechanism 532. Such a mechanism may combine the random bits using a function, e.g. the xor function. Noise can be calculated based on the combination of random bits in an answer/noise combining mechanism 533. Again, 532, 533, and 534 may be one or more computing devices equipped with software for performing the specified function. The output of mechanism 533 is the collective noisy result 534.

Exemplary Computing and Network Environment

The invention may be implemented in the general context of computer-executable instructions, such as program modules, being executed by computers. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

A computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 6:
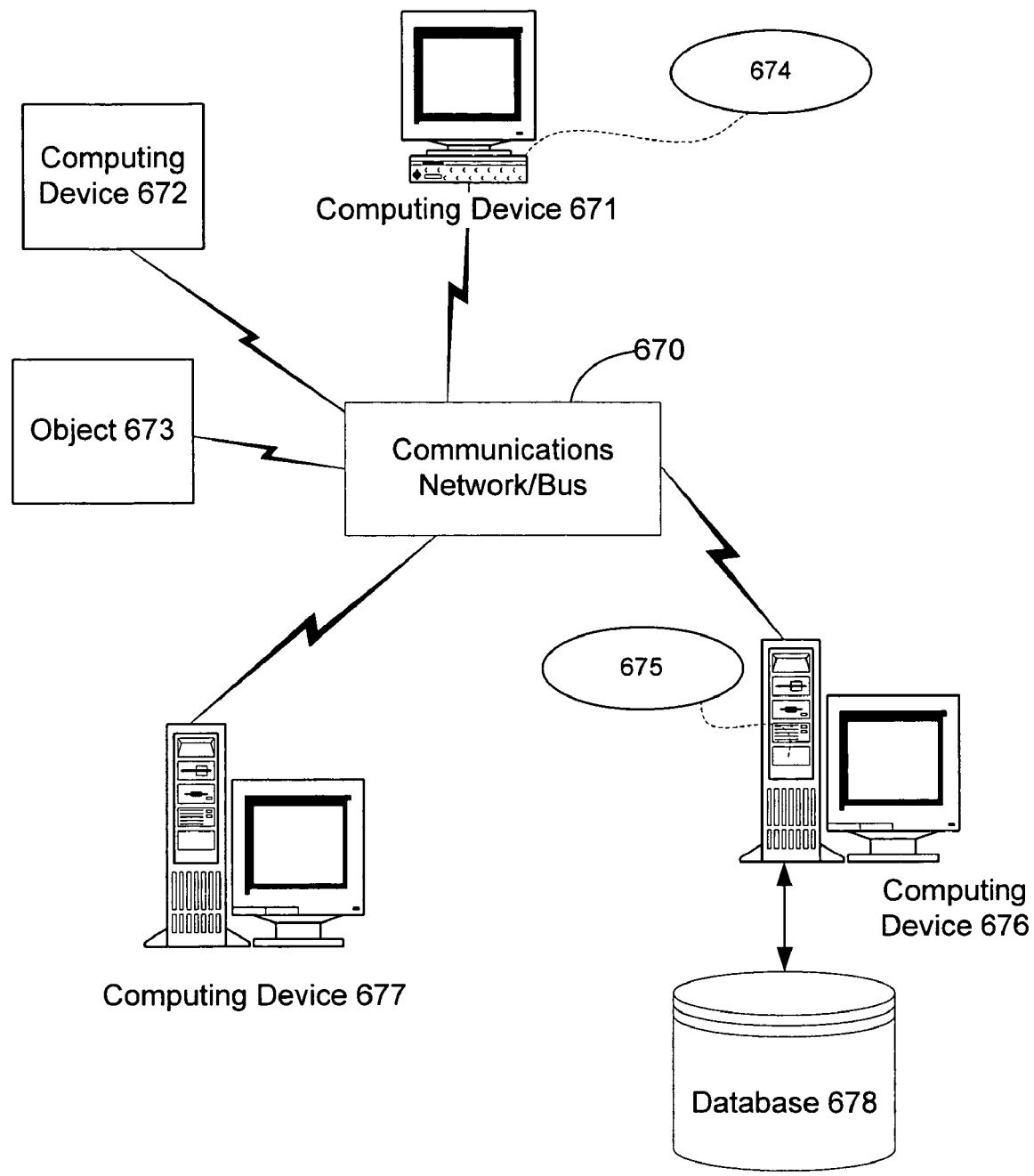
FIG. 6 illustrates an exemplary computing network suitable for practicing the invention.

An exemplary networked computing environment is provided in FIG. 6. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 6 provides a schematic diagram of an exemplary networked or distributed computing environment. The environment comprises computing devices 671, 672, 676, and 677 as well as objects 673, 674, and 675, and database 678. Each of these entities 671, 672, 673, 674, 675, 676, 677 and 678 may comprise or make use of programs, methods, data stores, programmable logic, etc. The entities 671, 672, 673, 674, 675, 676, 677 and 678 may span portions of the same or different devices such as PDAs, audio/video devices, MP3 players, personal computers, etc. Each entity 671, 672, 673, 674, 675, 676, 677 and 678 can communicate with another entity 671, 672, 673, 674, 675, 676, 677 and 678 by way of the communications network 670. In this regard, any entity may be responsible for the maintenance and updating of a database 678 or other storage element.

This network 670 may itself comprise other computing entities that provide services to the system of FIG. 6, and may itself represent multiple interconnected networks. In accordance with an aspect of the invention, each entity 671, 672, 673, 674, 675, 676, 677 and 678 may contain discrete functional program modules that might make use of an API, or other object, software, firmware and/or hardware, to request services of one or more of the other entities 671, 672, 673, 674, 675, 676, 677 and 678.

It can also be appreciated that an object, such as 675, may be hosted on another computing device 676. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 6, any entity 671, 672, 673, 674, 675, 676, 677 and 678 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of FIG. 6, the systems and methods provided herein cannot be construed as limited in any way to a particular computing architecture. Instead, the present invention should not be limited to any single embodiment, but rather should be construed in breadth and scope in accordance with the appended claims.

The invention claimed is:

1. A computer-implemented method for computing a collective noisy result, the method comprising:
a computer receiving a query from a querying entity, wherein the query received from the querying entity is regarding a data collection comprising a plurality of subsets of the data collection, each subset associated with a corresponding privacy principal;
the computer determining whether the query received from the querying entity conforms to a corresponding data-independent policy determined by each of a plurality of privacy principals, each data-independent policy based upon the querying entity; and
the computer limiting a number of queries applied to a subset of data associated with one of the plurality of privacy principals by applying the query received from the querying entity to the subset of data associated with the one of the plurality of privacy principals only if the query received from the querying entity conforms to the data independent policy determined by the privacy principal associated with the subset of data to obtain a subset result, by:

the computer dividing the subset result into one or more shares;
the computer participating in combining shares of subset results by exchanging shares with another computer to obtain a collective result;
the computer generating random bits;
the computer combining the random bits, wherein a combination of random bits is used to generate noise, wherein said noise is an unknown and unpredictable quantity having a known distribution, and wherein an amount of the noise generated is dependent upon the data independent policy; and
the computer combining said noise with the collective result to obtain a collective noisy result as the subset result.

2. The method of claim 1, wherein the subset of data is privately stored on the computer.

3. The method of claim 1, wherein the subset of data comprises personal information about a human.

4. The method of claim 1, wherein the query received from the querying entity is simultaneously received by a plurality of computers, and wherein a subset of data is privately stored on each of said computers.

5. The method of claim 1, wherein said combining the random bits uses distributed coin flipping.

6. A computer-implemented method for computing a collective noisy result, the method comprising:
receiving a query, associated with a querying entity, from a first computer at a plurality of computers;
determining whether the received query conforms to a corresponding data-independent policy determined by each of a plurality of privacy principals, each data-independent policy based upon the querying entity; and
the plurality of computers limiting a number of queries applied to each of a plurality of subsets of data, each subset of data associated with a privacy principal by applying the received query to a subset of data only if the received query conforms to the data independent policy determined by the privacy principal associated with the subset of data to obtain a plurality of subset results;
the plurality of computers dividing the subset results into one or more shares;
the plurality of computers combining the shares of subset results by exchanging shares with another computer to obtain a collective result;
the plurality of computers generating random bits;
the plurality of computers combining the random bits;
at least one computer of said plurality of computers generating noise based on a combination of the random bits wherein said noise is an unknown and unpredictable quantity having a known distribution, and wherein an amount of the noise generated is dependent upon the data independent policy; and
at least one computer of said plurality of computers generating a collective noisy result as said plurality of subset results by combining said collective result with an amount of the noise, wherein the amount of the noise combined with said collective result is dependent upon a total number of queries to which the data is exposed throughout a lifetime of the data.

7. The method of claim 6, wherein at least one subset of data is privately stored on one of said plurality of computers.

8. The method of claim 6, wherein at least one subset of data comprises personal information about a human.

9. The method of claim 6, wherein said combining the random bits uses distributed coin flipping.

10. A system for computing a collective noisy result, comprising:

a plurality of computing devices, each computing device having access to a subset of data, each subset of data associated with a privacy principal, and a corresponding data-independent policy, determined by the associated privacy principal, for determining one or more queries in which the computing device will participate, each of the data-independent policies based upon an origin of one or more of queries, wherein the corresponding data-independent policy of each computing device is independent of the subset of data and wherein the computing device will not participate in queries that do not conform to the data-independent policy;

a mechanism for distributing a query to the computing devices;

each computing device configured to limit a number of queries applied to its subset of data by applying the distributed query to each subset of data only if the distributed query conforms to the data independent policy determined by the privacy principal associated with the subset of data to obtain a subset result;

each computing device configured to divide its subset result into one or more corresponding shares;

at least one computing device configured to receive the corresponding shares of each computing device and to participate in combining the received shares by exchanging shares with another computer to obtain a collective result, wherein the at least one computing device cannot determine the corresponding computing device of each received share;

each computing device configured to generate random bits; and at least one computing device configured to participate in combining the random bits and in generating noise based on said random bits, wherein said noise is an unknown and unpredictable quantity having a known distribution, said at least one computing device being further configured to combine an amount of said noise to the collective result to obtain a collective noisy result, wherein the amount of said noise combined with said collective result is dependent upon a total number of queries to which the data is exposed throughout a lifetime of the data, and wherein the amount of said noise is dependent upon the data independent policy.

11. The system of claim 10, wherein at least one subset of data is privately stored on a computer.

12. The system of claim 10, wherein at least one subset of data comprises personal information about a human.

13. The system of claim 10, wherein said combining the random bits uses distributed coin flipping.

* * * * *